Sept. 20, 1955  E. FENNER ET AL  2,718,605
ELECTRICAL DISCHARGE TUBE
Filed Aug. 8, 1951
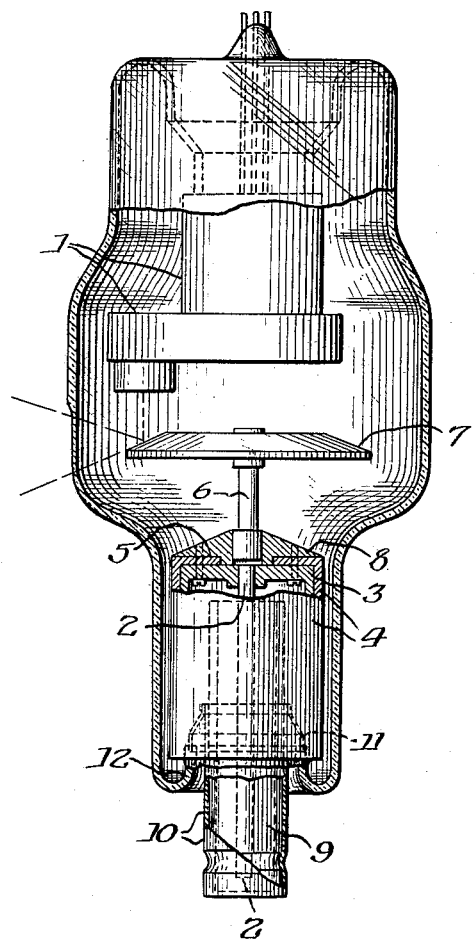
Inventors.
Eckhard Fenner, &
Adolf Schmidt.

United States Patent Office 2,718,605
Patented Sept. 20, 1955

2,718,605

ELECTRICAL DISCHARGE TUBE

Eckhard Fenner and Adolf Schmidt, Erlangen, Germany

Application August 8, 1951, Serial No. 240,948

Claims priority, application Germany August 28, 1950

14 Claims. (Cl. 313—60)

This invention relates to electrical discharge tubes, and is particularly concerned with a rotary anode X-ray tube having as a part of its anode system a metallic member made of copper which is, during its formation, annealed and thereafter solidified or hardened by rolling, drawing or like operations.

The solidification of such parts of the system is lost due to crystal-reformation if they are, for relatively extended periods of time, subjected to temperatures exceeding the recrystallization temperature thereof. Heating to such temperatures, however, cannot always be avoided with certainty during the degassing of the metallic tube parts, or during the operation of the tube. The consequence is that the corresponding part of the system, after losing its solidification, is deformed, especially at the points where it is secured or where other parts are fastened thereto, thereby affecting the operation of the tube.

These drawbacks are, in accordance with the invention, avoided by permanently inseparably bonding by welding or brazing at least the surface parts of the carrier and fastening portions of the member of the system consisting of the solidified metal with surface parts of an auxiliary supporting and protecting element or layer of iron or another metal having a similarly high melting point and good vacuum characteristics.

The individual crystals of the solidified metal forming the corresponding member of the system are at the brazed or welded bonding areas held in the positions fixed during the solidification, even incident to heating beyond the recrystallization temperature. Crystal reformation is thus prevented. The structure of the auxiliary iron or like supporting or protecting member is not substantially altered at the temperatures of about 500–600° C. which occur during the manufacture of the tube and during the operation thereof, and the structure of the solidified or hardened metal is thus permanently preserved at the bonded areas.

The recrystallization temperature of the solidified metal may be for short intervals exceeded during the time of bonding the more heat-resistant auxiliary metal part therewith, but such temporary and brief excess temperatures do not cause crystal-reformation and thus do not alter the structure of the solidified metal.

It has been found advantageous to bond the solidified metal with a more heat-resistant metal having a different thermal coefficient of expansion. The parts expand differently during the heating applied in the manufacture, and since they are in this expanded condition permanently inseparably bonded together, there will occur upon cooling, at the bonding areas, mechanical stresses which operate to further increase the solidity of the solidified metal. Therein lies another reason for bonding the solidified copper parts of the system with iron or the like, because the linear thermal coefficient of expansion of copper exceeds about thirty per cent (30%) that of iron.

The use of iron or the like for bonding with the solidified copper part of the system is also indicated on account of its relatively low cost and because it lends itself to easy machining.

The accompanying drawing shows in diagrammatic, partly elevational and partly cross-sectional representation an example of a rotary anode X-ray tube embodying the above mentioned and additional features of the invention.

In the drawing, numeral 1 indicates the cathode system. The rotary anode system comprises an anode disk 7 which is carried by a pin 6 extending from the transverse wall 5 of the cylindrical member 4 consisting of solidified copper. The stator has been omitted to avoid encumbering the drawing.

In accordance with the invention, the entire surface of the transverse wall of the copper cylinder 4 is bonded to the iron member 8 which is made as a frustum of a cone, so as to support and to protect or secure the solidification of the metal of this transverse wall, thus preventing crystal-reformation of the solidified material thereof. The inner surface of the transverse wall of the copper cylinder 4 abuts the outer surface of the iron member 3. The parts are assembled together by screws, as shown, and are, by means of the shaft 2, in suitable, not in detail illustrated manner journalled in the metallic tube 9. The latter is fastened in the potlike sealing and securing member 10 which is in vacuumtight manner connected with the envelope portion 12 by means of the tubular metallic member 11.

The drive for the rotary anode does not form part of the invention, and therefore has been omitted to keep the drawing simple. It may comprise a suitable induction motor.

Changes may be made within the scope and spirit of the appended claims.

We claim:

1. Electrical discharge tube of the class described having an electrode structure comprising an electrode and a coacting element which consists of solidified copper, and a device for protecting a predetermined portion of said electrode element against crystal-reformation responsive to heating so as to retain its solidified properties, said device comprising an auxiliary part made of a metal having a melting point and vacuum characteristics corresponding substantially to those of iron, said auxiliary part forming a surface for abutment with the surface of the portion of said electrode element which is to be protected against crystal-reformation responsive to heating, said surfaces being substantially permanently and inseparably bonded together substantially throughout the entire abutting areas thereof.

2. The structure defined in claim 1, wherein said predetermined portion of said electrode element is the portion thereof which carries said electrode.

3. The structure defined in claim 1, wherein said auxiliary part is made of iron.

4. The structure defined in claim 1, wherein said auxiliary part is permanently and inseparably bonded together with said electrode element by welding.

5. The structure defined in claim 1, wherein said auxiliary part is permanently and inseparably bonded together with said electrode element by brazing.

6. The structure defined in claim 1, wherein said auxiliary part consists of a metal having a coefficient of thermal expansion which is appreciably different from that of the metal of said electrode element.

7. The structure defined in claim 1, wherein said electrode element is a copper cylinder having a transversely extending wall at one end thereof, said transverse wall constituting the portion which is to be protected against crystal-reformation responsive to heating, said auxiliary part being permanently and inseparably bonded to said transverse wall, said electrode being supported by said protected transverse wall, and means extending from said protected transverse wall for journalling the associated electrode element.

8. In an X-ray tube of the rotary anode type, a generally cylindrical copper element having at one end thereof a transversely extending wall, a first auxiliary metallic layer coextensive with the outside of said transverse wall and permanently secured thereto throughout the transverse extent thereof, a second auxiliary metallic layer disposed inside of said copper cylinder and forming a wall which is coextensive with the inside of the transverse wall of said copper cylinder and is permanently secured thereto throughout the transverse extent thereof, an anode disk carried by and extending away from the transverse wall of said copper cylinder, and journal means carried by and extending from said transverse wall inside of said copper cylinder.

9. The structure defined in claim 8, wherein said auxiliary metallic layers consist of a metal having thermal and vacuum properties comparable to those of iron.

10. The structure defined in claim 8, wherein said auxiliary metallic layers consist of iron.

11. The structure defined in claim 8, wherein said auxiliary layers are made of a metal having a coefficient of expansion which differs greatly from that of copper.

12. The structure defined in claim 8, wherein said anode disk is carried by a holder secured to said first metallic layer and wherein said journal means is secured to said second metallic layer.

13. The structure defined in claim 8, wherein said second metallic layer also forms a wall which is coextensive with and permanently secured to at least a portion of the cylindrical inside wall of the said copper cylinder.

14. In an X-ray tube of the rotary anode type, a generally cylindrical copper element having at one end thereof a transversely extending wall, a first auxiliary metallic layer coextensive with the outside of said transverse wall and permanently secured thereto throughout the transverse extent thereof, a second auxiliary metallic layer disposed inside of said copper cylinder and forming a wall which is coextensive with the inside of the transverse wall of said copper cylinder and is permanently secured thereto throughout the transverse extent thereof, an anode disk carried by and extending away from the transverse wall of said copper cylinder, and journal means carried by and extending from said transverse wall inside of said copper cylinder, said auxiliary metallic layers being made of a metal which is resistant to structural alterations in the presence of temperatures to which said cylindrical copper element may be subjected so as to inhibit deformation of said copper element at the portions thereof which are provided with said layers.

References Cited in the file of this patent

UNITED STATES PATENTS

| | | |
|---|---|---|
| 1,893,759 | Bouwers | Jan. 10, 1933 |
| 1,977,275 | Holst et al. | Oct. 16, 1934 |
| 2,030,561 | Andrew | Feb. 11, 1936 |
| 2,345,723 | Atlee et al. | Apr. 4, 1944 |
| 2,430,800 | Atlee | Nov. 11, 1947 |
| 2,489,080 | Combee | Nov. 22, 1949 |